US012458907B2

(12) United States Patent
Augier et al.

(10) Patent No.: US 12,458,907 B2
(45) Date of Patent: Nov. 4, 2025

(54) CONCEPT FOR COLLECTION AND DISTRIBUTION CHANNELS FOR A SIMULATED MOVING BED SEPARATION PROCESS USING N-COLUMNS IN SERIES

(71) Applicant: IFP Energies nouvelles, Rueil-Malmaison (FR)

(72) Inventors: Frederic Augier, Saint Symphorien D Ozon (FR); Aude Royon-Lebeaud, Lyons (FR); Damien Leinekugel Le Cocq, Oullins (FR); Alexandre Vonner, Feyzin (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 1317 days.

(21) Appl. No.: 15/951,671

(22) Filed: Apr. 12, 2018

(65) Prior Publication Data
US 2018/0296941 A1 Oct. 18, 2018

(30) Foreign Application Priority Data

Apr. 12, 2017 (FR) .................................. 17/53.216

(51) Int. Cl.
| | |
|---|---|
| *B01D 15/18* | (2006.01) |
| *B01D 15/22* | (2006.01) |
| *C07C 7/12* | (2006.01) |
| *C07C 15/02* | (2006.01) |
| *G01N 30/60* | (2006.01) |

(52) U.S. Cl.
CPC ....... *B01D 15/185* (2013.01); *B01D 15/1842* (2013.01); *B01D 15/22* (2013.01); *C07C 7/12* (2013.01); *C07C 15/02* (2013.01); *G01N 30/6017* (2013.01); *B01D 2256/24* (2013.01); *B01D 2257/7027* (2013.01)

(58) Field of Classification Search
None
See application file for complete search history.

(56) References Cited

U.S. PATENT DOCUMENTS

| | | | |
|---|---|---|---|
| 6,171,502 B1 | 1/2001 | Mueller et al. | |
| 2004/0140007 A1 | 7/2004 | Bellqvist | |
| 2009/0321338 A1 | 12/2009 | Natarajan | |
| 2012/0118807 A1 | 5/2012 | Natarajan | |
| 2015/0376086 A1* | 12/2015 | Tinger | .................... C07C 2/864 |
| | | | 585/314 |
| 2016/0046545 A1* | 2/2016 | Maher | ..................... C07C 7/005 |
| | | | 585/805 |

FOREIGN PATENT DOCUMENTS

| | | |
|---|---|---|
| EP | 2138839 A2 | 12/2009 |
| WO | 1999062609 A1 | 12/1999 |
| WO | 2000050144 A1 | 8/2000 |
| WO | 2011159232 A1 | 12/2011 |

OTHER PUBLICATIONS

Search Report in corresponding French Application 17353216 dated Nov. 22, 2017.

* cited by examiner

*Primary Examiner* — Kara M Peo
(74) *Attorney, Agent, or Firm* — Millen, White, Zelano & Branigan; Ryan R. Pool

(57) ABSTRACT

The present invention describes a device for supplying or collecting from a column forming part of an assembly of columns in series, for use in a simulated moving bed separation process. The present device can be used to very substantially reduce the non-selective volumes in each column.

11 Claims, 2 Drawing Sheets ns in series.
CONCEPT FOR COLLECTION AND DISTRIBUTION CHANNELS FOR A SIMULATED MOVING BED SEPARATION PROCESS USING N-COLUMNS IN SERIES

CONTEXT OF THE INVENTION

The invention relates to a novel device for the distribution and collection of fluids in an N-column system in series employing a flow of said fluids in a medium of solid particles known as a granular medium.

A concatenation of N distinct or stacked columns (i.e. arranged in a communal envelope) is termed an N-column system in series. Each column houses a bed of granular medium in which the principal fluid flows. The N columns are connected together via a system of conduits which, as necessary, allow for injection/mixing or withdrawal of a secondary fluid, these possible injections and withdrawals taking place between the columns.

The present invention concerns the device which can be used to collect the principal fluid from the bottom of the bed or over the entire section of the column or, reciprocally, to transfer said fluid to the next column from the inter-column conduit.

The invention essentially consists of an arrangement of the collection zone or distribution zone located at the bottom of the column.

The invention may be used to provide an advantageous compensation for the distribution in the residence time for the fluid in a column between the two zones which are termed non-selective, i.e. outside the granular medium, which constitute the distribution zone at the head of the bed and the collection zone at the bottom of the bed, while substantially minimizing the volumes of the zones known as non-selective zones.

In fact, the invention concerns simulated moving bed (SMB) separation processes in which the synchronicity of the ensemble of the fluid streams in the bed, in the distribution system, and in the injection/collection system is particularly critical in order to guarantee the high levels of purity and yield required by the process. Hereinafter, for the purposes of brevity, this will be termed the fluid synchronicity.

The term "fluid synchronicity" means that if the section of the column is mentally divided into a plurality of fluid channels moving in parallel, all of the fluid channels must, as far as possible, have the same residence time from the inlet into the column to the outlet.

Furthermore, any increase in the volumes of the non-selective zones induces an undesirable increase in the pump-around flows in the facility, for the same performance levels, which is a problem to the selectivity of the process or increases the energy consumption of the overall process.

BRIEF DESCRIPTION OF THE DRAWINGS

All of the figures represent a downflow mode, but the invention is strictly symmetrical as regards an upflow mode.

EXAMINATION OF THE PRIOR ART

Figure 1:
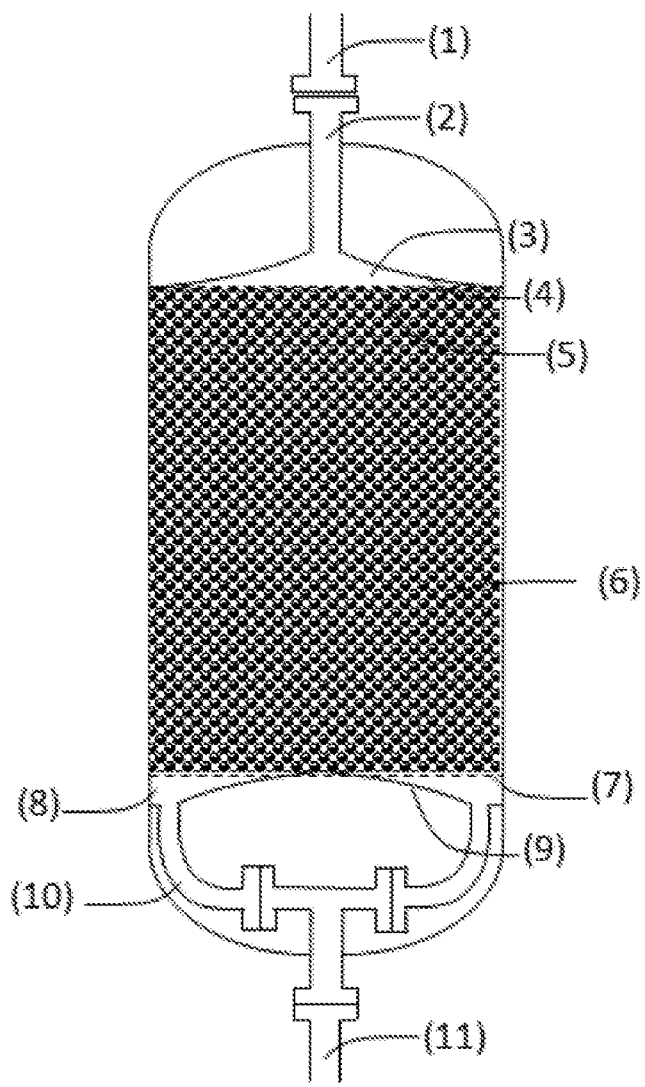
FIG. 1 represents a diagrammatic view of the entire column with its device for the distribution of fluids at the head and its collection device at the bottom.
Figure 1A:
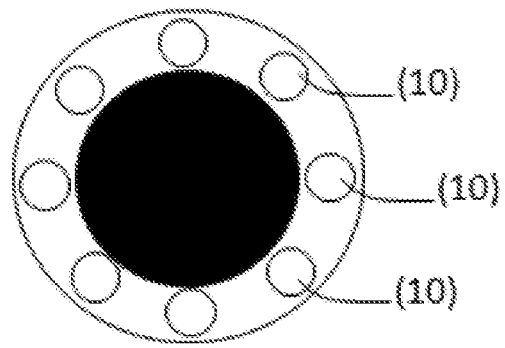
FIG. 1a is a top view which allows the positioning of the collection system at the periphery to be seen.

The prior art discloses how to dimension a distributor for a multi-stage column, i.e. constituted by a plurality of plates disposed along a substantially vertical axis, each plate supporting a bed of granular solid.

The patents EP 0 074 815, US 2006/0108274 A1, in particular, provide examples of distribution/mixing devices used in the case of simulated moving bed adsorption for a multi-stage column. These devices carry out the successive functions of collection of the principal fluid coming from the upstream bed and mixing of the principal fluid with the secondary fluid, and redistribution of the mixture towards the downstream bed.

Those patents describe dividing the section of the column into panels or radial sectors.

The prior art also teaches the importance of guaranteeing good synchronicity in the distribution system in order to obtain the required performances as regards the separation.

In particular, the patent FR 2 933 000 proposes adding a compensating element to the residence time, a baffle, in the non-selective zone just before or just after the distributor plate at the inlet to the column.

The prior art document by Silva M., Rodrigues A. and Mota J. "Effect of dead volumes on the performance of an industrial-scale simulated moving-bed parex unit or p-xy-lene purification", published in the AIChE Journal, January 2016, vol 62, no 1, teaches the importance of reducing the non-selective volumes, because increasing those volumes results in a fall in purity and an increase in desorbant consumption.

The patent U.S. Pat. No. 3,214,247 describes a contact chamber intended to supply a granular bed, said chamber having lateral perforations which can be used to introduce the gas or liquid phase laterally in two opposite directions. FIG. 3 of that text shows a channel with a tapered shape having a rectilinear wall.

The U.S. Pat. No. 3,789,989 describes equipment for the distribution of fluids to allow said fluid to pass from one bed to the next bed. The equipment is characterized by screens for retaining the solid and deflection plates located between the screens and having a thickness which decreases. None of those systems discloses a device with a view to compensating for the residence time.

Employing a simulated moving bed with an N-column system means that injection and collection is ensured, as well as mixing at a single point between two columns in the system. A configuration of this type overcomes problems with rinsing, as it thereby minimizes the volumes not rinsed by the pump around flow. In addition to this advantage, the present invention introduces a device the geometric shape of which can ensure near equality of the residence time for the fluid, irrespective of the path taken thereby as it passes through the granular bed, while minimizing the residence time in the zones said to be non-selective.

BRIEF DESCRIPTION OF THE INVENTION

The present invention can be defined as a device for the distribution and collection of fluid in a column comprising a bed of granular solid, the unit generally being composed of several columns disposed in series.

This device is particularly suitable for a simulated moving bed separation process because it can be used to substantially reduce the volumes termed non-selective volumes by substantially minimizing the dispersion of these zones, as illustrated in the example forming part of the present application.

Hereinafter, the term "incoming fluid" will be used to denote the fluid entering the column and "outgoing fluid" to denote the fluid leaving the column.

The process using the present device generally makes use of a plurality of columns in series, each column using the device in accordance with the invention either as a means for introducing incoming fluid, or as a means for collecting outgoing fluid.

The fluid flow within the granular bed in these columns may be axial or radial.

Any disposition of the series of columns provided with the device in accordance with the invention, either as a means for introduction or as a means for collection, will fall within the scope of the present invention.

More precisely, the present invention may thus be defined as a device for the distribution of fluid or for the collection of outgoing fluid in one or more columns provided with a bed of granular solid, in which:
  the incoming fluid is distributed by means of a distribution channel with a variable section in which the fluid flows at a constant velocity,
  the outgoing fluid is collected by means of a distribution channel with a variable section in which the fluid flows at a constant velocity.

In particular, the present device is applicable to a simulated moving bed separation process using a plurality of columns disposed in series.

In this case, and in accordance with a first variation shown in FIGS. 1 and 1.a, the simulated moving bed process using the collection device in accordance with the invention may be described as follows:

The circulation of fluid inside the bed of granular solid is axial, and injection into the bed is carried out by means of a conduit (2) substantially centred on the vertical axis of the column, which supplies the horizontal distribution channel (3) defined by a curved wall (4), the bed of granular solid (6) then being supplied from said distribution channel (3) through a screen (5), and the fluid flows through the granular bed (6) in a substantially vertical direction, the fluid then being collected below the screen (7) from a collection channel (8) defined by a curved wall (9) via peripheral conduits (10), and the whole of the flow then being collected in a single evacuation conduit (11) substantially centred on the vertical axis of the column.

In accordance with a second variation, shown in FIG. 2, the process using the distribution device in accordance with the invention may be described as follows:

The circulation of the fluids inside the bed of granular solid is carried out radially, the fluid being introduced into the centre of the column via the conduit (2) which supplies the central channel (3) defined in the centre by the wall (4), then passing through the granular bed (6) from the centre towards the periphery (defined by the screens (5) and (7)) where it is collected in the peripheral zone (8) defined at the outside by the wall (9), which returns the liquid via the peripheral conduits (10) to the evacuation conduit (11) which is substantially centred on the axis of the column.

The simulated moving bed separation process using the device in accordance with the invention may be such that the feed to be separated is any mixture of aromatic compounds containing 7 to 9 carbon atoms.

The simulated moving bed separation process employing the device in accordance with the invention may be such that the feed to be separated is a mixture of normal- and iso-paraffins.

The simulated moving bed separation process employing the device in accordance with the invention may be such that the feed to be separated is a mixture of normal- and iso-olefins.

The simulated moving bed separation process employing the device in accordance with the invention may be such that the principal fluid passing through said device has a density in the range 600 to 950 kg/m$^3$ and a viscosity in the range 0.1 to 0.6 cPo.

DETAILED DESCRIPTION OF THE INVENTION

The problem which the present invention seeks to overcome is that of limiting the differences in residence times in the non-selective zones of an N-column system in series, each column being provided with a granular bed. These differences in fact deteriorate the separation performances, while minimizing the volumes of said non-selective zones (hereinafter termed the non-selective volumes, for simplicity) which result in an unwanted increase in the pump around flow of the facility for the same levels of performance as a system which does not have non-selective zones.

The invention pertains to a system which can be used to guarantee a good synchronicity of the fluid in the distribution/collection system on the scale of the complete section of the column, and which also produces a low non-selective volume by appropriately tailoring the shape of the distribution and collection channels.

The columns in accordance with the invention may be organized into two modes of flow:
  An axial mode, in which the flow inside the granular bed is essentially along the vertical axis of the column.
  A radial mode, in which the flow inside the granular bed is essentially from the periphery towards the centre of the column or from the centre of the column towards the periphery.

The dimensions of the columns, as a function of the flow mode, are as follows:
  For an axial mode, a diameter in the range 1 to 15 m, preferably in the range 7 to 12 m. The height of the granular bed varies between 0.2 and 1.5 m, preferably between 0.4 and 1 m.
  For a radial mode, a diameter in the range 1.5 to 15 m, a height which can develop a section in the range 1 to 200 m$^2$, preferably in the range 5 to 80 m$^2$. The section of the granular bed changes as a function of the radius from the incoming collector to the outgoing collector. The thickness of the granular bed varies between 0.2 and 1.5 m, preferably between 0.4 and 1 m.

The injections and collections as well as mixing are carried out at a single point between two columns in the system (1).

In accordance with a first embodiment shown in FIG. 1, the bed is in axial mode, and injection into the bed is carried out by means of a conduit (2) substantially centred on the vertical axis of the column which supplies the horizontal distribution channel (3) via a jet. In general, the distribution channel is equipped with a jet breaker, not shown in FIG. 1. The wall (4) of the distribution channel (3) has a shape which can ensure a constant velocity $V_{channel}$ in the distribution channel (3), which means that the non-selective volumes can be radically minimized and that a homogeneous distribution of the flow can be obtained in the granular bed (6).

This velocity is in the range 0.1 to 5 m/s, ideally in the range 0.5 to 2.5 m/s. The height of the channel (3) defined from the screen (5), $h_{sup}(r)$ as a function of the radial coordinate r ideally follows the following profile:

$$h_{sup}(r) = \frac{1}{2} \frac{V_{SL}}{V_{channel}} \frac{R^2 - r^2}{r}$$

in which $V_{SL}$ is the superficial velocity of fluid in the granular bed, defined as the ratio of the volume flow rate to the section of the column, and R is the radius of the column.

The granular bed (6) is then fed from the distribution channel (3) through a screen (5).

The fluid flows through the granular bed (6) in a substantially vertical direction.

The fluid is then collected in the collection channel (8) below the screen (7).

The wall (9) of the collection channel (8) ideally has the following profile:

$$h_{inf}(r) = h_{sup}(r) \frac{r^2}{R^2 - r^2}$$

This profile means that the residence times for all of the fluid streams between the inlet via the conduit (2) and the outlet via the conduit (11) are equal.

The representations of the walls 4 and 9 in FIG. 1 are diagrammatic and do not correspond to the mathematical shape.

In accordance with this embodiment, the fluid leaving the channel (8) is collected via a system of conduits (10) located at the periphery, as can be seen in FIG. 1.a, which collects the outgoing fluid in the evacuation conduit (11).

The number of conduits (10) generally varies between 4 and 20, preferably between 6 and 12. The dimensions of the conduit sections will be such as to ensure a fluid velocity in the range 1 to 8 m/s.

Furthermore, the scope of the present invention includes reversing the distribution and collection system, i.e., more precisely by using the distribution system described above as a collection system, and by using the collection system described above as a distribution system.

In an industrial unit comprising a sequence of columns, these columns may be any that has a distribution system in accordance with the invention, or in fact any that has a collection system in accordance with the invention. It is also possible to connect the columns in an alternating manner, i.e. one column with a collection system in accordance with the invention, and the next with a distribution system in accordance with the invention.

Figure 2:
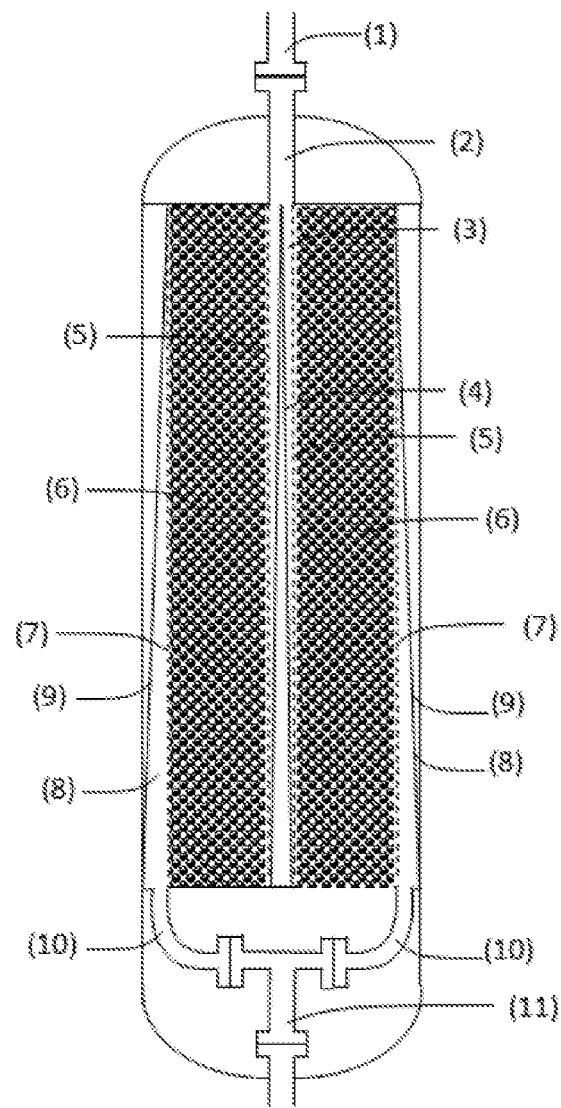
FIG. 2 represents a diagrammatic view of the column in a variation said to be in radial flow mode for the fluid, with the collection system in accordance with the invention.

In accordance with a second embodiment, shown in FIG. 2, the bed operates radially and injection into the bed is carried out by means of a vertical conduit (2), or by means of an annular tube positioned substantially in the centre of the column defined in the centre by the wall (4).

The wall (4) of the distribution channel (3) has a shape which can guarantee a constant velocity $V_{channel}$ in the distribution channel and a homogeneous distribution of the flow in the granular bed (6). This velocity is in the range 0.1 to 5 m/s, ideally in the range 0.5 to 2.5 m/s. The radial position of the wall (4), $r_{distrib}(z)$, taken from the axis of the column, as a function of the axial coordinate z taken from the inlet for fluid into the column, ideally has the following profile:

$$r_{distrib}(z) = \sqrt{r_{distrib}(0) - 2\frac{V_{SL}}{V_{channel}} r_{distrib}(0)(H_{bed} - z)}$$

in which $H_{bed}$ is the total height of the granular bed.

The liquid flows radially in the bed (5) from the centre towards the periphery of the bed, and is collected in the peripheral zones (8). The radial position of the wall (9), $r_{collect}(z)$, taken from the axis of the column, as a function of the axial coordinate z taken from the inlet for fluid into the column, ideally has the following profile:

$$r_{collect}(z) = \sqrt{(r_{distrib}(0) + E_{bed})^2 + \frac{z}{H - z}(r_{distrib}(0)^2 - r_{distrib}(z)^2)}$$

in which $E_{bed}$ is the thickness of the bed defined in the radial direction.

The representations shown in FIG. 2 are diagrammatic and do not reproduce the mathematical shapes of $r_{distrib}(z)$ and $r_{collect}(z)$.

The whole of the flow is collected by the system of conduits (10) located at the periphery which brings the outgoing fluid into the evacuation conduit (11).

Either all of the columns have a distribution system in accordance with the invention, or they all have a collection system in accordance with the invention. It is also possible to connect the columns in an alternating manner, i.e. one column with a collection system in accordance with the invention, and the next with a distribution system in accordance with the invention.

As explained above, the scope of the present invention includes reversing the distribution and collection system, i.e., more precisely, by using the distribution system described above as a collection system, and by using the collection system described above as a distribution system.

The invention may also be described as a process for simulated moving bed separation employing the device in accordance with the invention, in which the feed to be separated is any mixture of aromatic compounds containing 7 to 9 carbon atoms.

The invention may also be viewed as a process for simulated moving bed separation employing the device in accordance with the invention, in which the feed to be separated is a mixture of normal- and iso-paraffins.

The invention may also be viewed as a process for simulated moving bed separation employing the device in accordance with the invention, in which the feed to be separated is a mixture of normal- and iso-olefins.

The invention may also be viewed as a process for simulated moving bed separation employing the device in accordance with the invention, in which the principal fluid passing through said device has a density in the range 600 to 950 kg/m³ and a viscosity in the range 0.1 to 0.6 cPo.

EXAMPLES IN ACCORDANCE WITH THE PRIOR ART AND IN ACCORDANCE WITH THE INVENTION

Consider a column with a diameter of 10 m comprising a granular bed 1 m high. The flow of a fluid with a density of 725 kg/m³ and a viscosity of 0.2 cP occurs inside the column with a superficial velocity of 2 cm/s. This superficial velocity is calculated over the section of the column which is assumed to be free.

The prior art presented in the patent FR 2 933 000 explains how to dimension a baffle in order to correct the distribution of the residence times. The ratio between the annular section (passage of liquid between the edge, the baffle and the wall of the column) and the total section of the column was selected so as to be identical to that of the example of the patent, i.e. 8.3%. The person skilled in the art will obtain a maximum velocity in the distribution and collection channels and in the distribution and collection conduits, this velocity serving to dimension said channels and said conduits. In this example, a maximum velocity of 2.5 m/s was used. When dimensioning in accordance with this prior art, this results in a non-selective volume (distribution and collection) of 13.2 m³.

In accordance with the present invention, and using a dimensioning velocity for the channels of 1 m/s so as not to increase the dispersion in the granular bed, the volume of the non-selective zones was 2.2 m³.

The person skilled in the art will evaluate and might adjust the velocity of 1 m/s on the basis of reasoning that the maximum admissible pressure drop in order to retain an equivalent theoretical plate height in the bed is 1 mm.

Thus, the present invention can divide the non-selective volume by 2 compared with the prior art represented by the patent U.S. Pat. No. 3,214,247 and can divide the non-selective volume calculated using the older prior art defined in patent FR 2 933 000 by almost 4.

These reductions in volume are accomplished by reducing the dispersion in the residence times. In fact, the reduction in the non-selective volume and the dispersion is an essential element in maintaining the performances of the simulated moving bed separation process.

| | Volume of non-selective zones (m³) | Variance in the non-selective zones (s²) |
|---|---|---|
| Prior art dimensioning without profiling of the channels | 26.5 | 4 |
| Dimensioning with linear profile (cf U.S. Pat. No. 3,789,989), without compensation | 13.2 | 2 |
| Dimensioning in accordance with the invention, with compensation | 7.6 | 1 |

The invention claimed is:

1. A device for the distribution or collection of a fluid in a bed of granular solid (6) contained in a column for carrying out a separation into a plurality of components, wherein the bed of granular solid (6) has a bottom and the column has a bottom and a top and a center in each horizontal plane between the bottom and the top of the column, in which:
   incoming fluid is distributed by a distribution channel (3) with a variable section in which the fluid flows at a constant velocity $V_{channel}$ of between 0.1 and 5 m/s, wherein the distribution channel (3) does not contain a porous material and wherein the constant velocity $V_{channel}$ is ensured by the shape of the distribution channel (3) not containing a porous material,
   outgoing fluid is collected by a collection channel (8) with a variable section in which the fluid flows at the constant velocity $V_{channel}$;
   and
   (A)
   the distribution channel (3) is delimited by a first screen (5) on top of the bed of granular solid (6) and a wall (4) at a distance $h_{sup}(r)$ above said first screen (5), which $h_{sup}(r)$ has a profile along a radial coordinate r, which r from the center of the column in a horizontal plane is a distance along R, which R is the radius of the column, defined by the following formula:

$$h_{sup}(r) = \frac{1}{2} \frac{V_{SL}}{V_{channel}} \frac{R^2 - r^2}{r}$$

the collection channel (8) is delimited by a second screen (7) at the bottom of the bed of granular solid (6) and a wall (9) at a distance $h_{inf}(r)$ below said second screen, which $h_{inf}(r)$ has a profile along the radial coordinate r, defined by the following formula:

$$h_{inf}(r) = h_{sup}(r) \frac{r^2}{R^2 - r^2}$$

in which $V_{SL}$ is the superficial velocity of fluid in the bed of granular solid (6), defined as a ratio of volume flow rate to a cross sectional area;
   or
   (B)
   the distribution channel (3) is delimited by a first screen (5) in a shape of a tube centered in the column present vertically through the bed of granular solid (6), which bed of granular solid (6) surrounds said tube, and a wall (4) inside said tube, wherein the wall (4) has a radial profile taken from the axis of the column $r_{distrib}(z)$ along an axial coordinate z, which z is taken from the inlet for the fluid into the column, defined by the following formula:

$$r_{distrib}(z) = \sqrt{r_{distrib}(0) - 2\frac{V_{SL}}{V_{channel}} r_{distrib}(0)(H_{bed} - z)}$$

the collection channel (8) is delimited by a second screen (7) in the shape of a tube centered in the column present vertically surrounding the bed of granular solid (6) and a wall (9) having a radial profile $r_{collect}(z)$ along the axial coordinate z, defined by the following formula:

$$r_{collect}(z) = \sqrt{(r_{distrib}(0) + E_{bed})^2 + \frac{z}{H_{bed} - z}(r_{distrib}(0)^2 - r_{distrib}(z)^2)}$$

in which $V_{SL}$ is the superficial velocity of fluid in the bed of granular solid (6) defined as a ratio of volume flow rate to a cross sectional area, $H_{bed}$ is the total height of the column, and $E_{bed}$ is the thickness of the bed along the radial direction.

2. A simulated moving bed process using the collection device as claimed in claim 1, which device comprises (A), in which process fluid inside the bed of granular solid circulates, and injection into the bed is carried out by a conduit (2) centered on a vertical axis of the column, which supplies the distribution channel (3), which is horizontal, defined by the wall (4) of the distribution channel (3), the bed of granular solid (6) then being supplied from said distribution channel (3) through the first screen (5), and the fluid flows through the bed of granular solid (6) in a vertical direction, the fluid then being collected below the second screen (7) from the collection channel (8) defined by the wall (9) of the collection channel (8) via peripheral conduits (10), and the whole of the flow being collected in a single evacuation conduit (11) centered on the vertical axis of the column.

3. A simulated moving bed separation process using the device as claimed in claim 1, in which a feed to be separated is a mixture of aromatic compounds containing 7 to 9 carbon atoms.

4. A simulated moving bed separation process using the device as claimed in claim 1, in which a feed to be separated is a mixture of normal- and iso-paraffins.

5. A simulated moving bed separation process using the device as claimed in claim 1, in which a feed to be separated is a mixture of normal- and iso-olefins.

6. A simulated moving bed separation process using the device as claimed in claim 1, in which the fluid passing through said device has a density in the range 600 to 950 kg/m³ and a viscosity in the range 0.1 to 0.6 cPo.

7. The device according to claim 1, which comprises (A), wherein the distribution channel (3) is delimited by the first screen (5) on top of the bed of granular solid (6) and the wall (4) at the distance $h_{sup}$ (r) above said first screen (5), which $h_{sup}$ (r) has a profile along the radial coordinate r, which r from the center of the column in a horizontal plane is the distance along R, which R is the radius of the column, defined by the following formula:

$$h_{sup}(r) = \frac{1}{2} \frac{V_{SL}}{V_{channel}} \frac{R^2 - r^2}{r}$$

the collection channel (8) is delimited by the second screen (7) at the bottom of the bed of granular solid (6) and the wall (9) at the distance $h_{inf}$ (r) below said second screen, which $h_{inf}$ (r) has a profile along the radial coordinate r, defined by the following formula:

$$h_{inf}(r) = h_{sup}(r) \frac{r^2}{R^2 - r^2}$$

in which $V_{SL}$ is the superficial velocity of fluid in the bed of granular solid (6), defined as a ratio of volume flow rate to a cross sectional area.

8. A device for the distribution or collection of a fluid in a bed of granular solid (6) contained in a column for carrying out a separation into a plurality of components, wherein the bed of granular solid (6) has a bottom and the column has a bottom and a top and a center in each horizontal plane between the bottom and the top of the column, in which:

incoming fluid is distributed by a distribution channel (3) with a variable section in which the fluid flows at a constant velocity $V_{channel}$ of between 0.1 and 5 m/s, wherein the distribution channel (3) is defined by a void space and wherein the constant velocity $V_{channel}$ is ensured by the shape of the distribution channel (3) being a void space, outgoing fluid is collected by a collection channel (8) with a variable section in which the fluid flows at the constant velocity $V_{channel}$;

and (A)

the distribution channel (3) is delimited by a first screen (5) on top of the bed of granular solid (6) and a wall (4) at a distance $h_{sup}$ (r) above said first screen (5), which $h_{sup}$ (r) has a profile along a radial coordinate r, which r from the center of the column in a horizontal plane is a distance along R, which R is the radius of the column, defined by the following formula:

$$h_{sup}(r) = \frac{1}{2} \frac{V_{SL}}{V_{channel}} \frac{R^2 - r^2}{r}$$

the collection channel (8) is delimited by a second screen (7) at the bottom of the bed of granular solid (6) and a wall (9) at a distance $h_{inf}$ (r) below said second screen, which $h_{inf}$ (r) has a profile along the radial coordinate r, defined by the following formula:

$$h_{inf}(r) = h_{sup}(r) \frac{r^2}{R^2 - r^2}$$

in which $V_{SL}$ is the superficial velocity of fluid in the bed of granular solid (6), defined as a ratio of volume flow rate to a cross sectional area;

or (B)

the distribution channel (3) is delimited by a first screen (5) in a shape of a tube centered in the column present vertically through the bed of granular solid (6), which bed of granular solid (6) surrounds said tube, and a wall (4) inside said tube, wherein the wall (4) has a radial profile taken from the axis of the column $r_{distrib}(z)$ along an axial coordinate z, which z is taken from the inlet for the fluid into the column, defined by the following formula:

$$r_{distrib}(z) = \sqrt{r_{distrib}(0) - 2\frac{V_{SL}}{V_{channel}} r_{distrib}(0)(H_{bed} - z)}$$

the collection channel (8) is delimited by a second screen (7) in the shape of a tube centered in the column present vertically surrounding the bed of granular solid (6) and a wall (9) having a radial profile $r_{collect}(z)$ along the axial coordinate z, defined by the following formula:

$$r_{collect}(z) = \sqrt{(r_{distrib}(0) + E_{bed})^2 + \frac{z}{H_{bed} - z}(r_{distrib}(0)^2 - r_{distrib}(z)^2)}$$

in which $V_{SL}$ is the superficial velocity of fluid in the bed of granular solid (6) defined as a ratio of volume flow rate to a cross sectional area, $H_{bed}$ is the total height of the column, and $E_{bed}$ is the thickness of the bed along the radius R.

9. The device according to claim 8, which comprises (A), wherein
the distribution channel (3) is delimited by the first screen (5) on top of the bed of granular solid (6) and the wall (4) at the distance $h_{sup}$ (r) above said first screen (5), which $h_{sup}$ (r) has a profile along the radial coordinate r, which r from the center of the column in a horizontal plane is the distance along R, which R is the radius of the column, defined by the following formula:

$$h_{sup}(r) = \frac{1}{2} \frac{V_{SL}}{V_{channel}} \frac{R^2 - r^2}{r}$$

the collection channel (8) is delimited by the second screen (7) at the bottom of the bed of granular solid (6) and the wall (9) at the distance $h_{inf}$ (r) below said second screen, which $h_{inf}$ (r) has a profile along the radial coordinate r, defined by the following formula:

$$h_{inf}(r) = h_{sup}(r) \frac{r^2}{R^2 - r^2}$$

in which $V_{SL}$ is the superficial velocity of fluid in the bed of granular solid (6), defined as a ratio of volume flow rate to a cross sectional area.

10. A simulated moving bed process using the collection device as claimed in claim 8, which device comprises (A), in which process fluid inside the bed of granular solid circulates, and injection into the bed is carried out by a conduit (2) centered on a vertical axis of the column, which supplies the distribution channel (3), which is horizontal, defined by the wall (4) of the distribution channel (3), the bed of granular solid (6) then being supplied from said distribution channel (3) through the first screen (5), and the fluid flows through the bed of granular solid (6) in a vertical direction, the fluid then being collected below the second screen (7) from the collection channel (8) defined by the wall (9) of the collection channel (8) via peripheral conduits (10), and the whole of the flow being collected in a single evacuation conduit (11) centered on the vertical axis of the column.

11. A simulated moving bed separation process using the device as claimed in claim 8, in which
a feed to be separated is a mixture of aromatic compounds containing 7 to 9 carbon atoms; and/or
the fluid passing through said device has a density in the range 600 to 950 kg/m³ and a viscosity in the range 0.1 to 0.6 cPo.

* * * * *